Fig. 1.

INVENTOR.
FRANCISCO C. WITT
BY James B Boyer
ATTORNEY

June 14, 1955 — F. C. WITT — 2,710,787
APPARATUS FOR INDICATING AND RECORDING TIME INTERVALS
Filed Feb. 23, 1952 — 6 Sheets-Sheet 2

INVENTOR.
FRANCISCO C. WITT
BY James B. Boyer
ATTORNEY

June 14, 1955    F. C. WITT    2,710,787
APPARATUS FOR INDICATING AND RECORDING TIME INTERVALS
Filed Feb. 23, 1952    6 Sheets-Sheet 4

INVENTOR.
FRANCISCO C. WITT
BY
James B. Boyer
ATTORNEY

June 14, 1955 F. C. WITT 2,710,787
APPARATUS FOR INDICATING AND RECORDING TIME INTERVALS
Filed Feb. 23, 1952 6 Sheets-Sheet 5

Fig. 10.

INVENTOR.
FRANCISCO C. WITT
BY
James B Boyer
ATTORNEY

Fig. 11.

United States Patent Office 2,710,787
Patented June 14, 1955

2,710,787
APPARATUS FOR INDICATING AND RECORDING TIME INTERVALS

Francisco C. Witt, East Meadow, N. Y., assignor to National-Simplex-Bludworth, Inc., New York, N. Y., a corporation of Delaware Application February 23, 1952, Serial No. 272,982

9 Claims. (Cl. 346—74)

The present invention relates to apparatus for indicating and recording time intervals. It is illustrated and described herein as applied to echo depth finder apparatus wherein it is used to record and/or indicate the intervals between the sending of signals such as compression waves or sound waves from a ship and the receiving of echoes of those signals from the bottom of the body of water in which the ship is floating. When the apparatus is so used, the intervals recorded or indicated serve as a measure of the depth of the water. Certain features of the invention are of particular utility in connection with echo depth finding apparatus, while other features are of more general utility.

It is common in commercial depth finder apparatus to use a recording or indicating element continuously driven at a constant speed. Means are provided to actuate a signal transmitter as the driven element passes a datum point, for example, a zero mark on a record sheet. When an echo signal is received, the driven element is actuated to produce a record on the sheet or an indication. Since the element is moving at a fixed speed, the distance through which it travels between the datum point and the point where the echo is received serves as a measure of the distance through which the sound wave passes.

A typical recorder for use with depth finding apparatus is illustrated in the patent to Hughes No. 2,309,956. The continuously driven element in that recorder is a stylus moving in a circular path, a portion of which path extends across the face of a record sheet. The stylus is electrically conductive and an electrically conductive platen is located behind the record sheet. The sheet itself is made electrically sensitive, so that it is marked by a discharge of electricity between the stylus and the platen. Such as discharge is produced when an echo is received.

Typical indicators used with depth finding apparatus are illustrated in the patent to Blaisdell No. 2,394,286. Blaisdell shows in Fig. 5, for example, an indicator comprising a cylindrical drum having a translucent scale on its periphery. The drum is located within a housing having a window through which the scale indicia are visible. The drum is illuminated from within by a flashing lamp located behind it. The flashes of the lamp are timed with the rotation of the drum so that the indicia are illuminated with a stroboscopic effect.

An object of the present invention is to provide a combined indicator and recorder unit for the measurement of time intervals. A further object is to provide an improved constant speed drive mechanism for such a unit. Another object is to provide such a unit which is more simple and compact than those of the prior art. A further object is to provide such a unit which is improved from the standpoint of access for inspection and repair.

Another object is to provide improved mechanism for recording time intervals. A further object is to provide an improved electrical stylus mechanism for a recorder of the type described.

A further object is to provide an improved apparatus for indicating time intervals, including an improved stroboscopic lamp and rotating indicator.

The foregoing and other objects of the invention are attained by providing a housing having a large window through which a record sheet is visible and an adjacent smaller window through which an indicator is visible. Inside the housing there is hingedly mounted a frame which may be swung out of the housing for inspection and repair purposes. The frame carries the indicator, the record sheet and mechanism for driving the sheet at a constant rate of speed. At one end, the frame also supports pulleys on which a perforated metal belt runs. This belt carries an electrical stylus and moves it repeatedly across the record sheet. The belt cooperates with a sprocketed pulley attached to the rotating drum which serves as an indicator so that the stylus and the indicator drum are driven together. A contact for initiating the operation of the transmitter and thereby defining the beginnings of the intervals being measured is located within the hub of the indicator drum. An electrical circuit for driving the transmitter and an amplifier for the received signals defining the ends of the intervals is also located within the housing. The principal parts of the amplifier are mounted within the housing on its base so as to be accessible when the frame is swung outwardly. The lamp and certain electrical parts which are associated with it are mounted on a support attached to the swingable frame and located within the indicator drum.

Other objects and advantages of the invention will become apparent from a consideration of the following specification and claims, taken together with the accompanying drawings. In the drawings:

Figure 1:
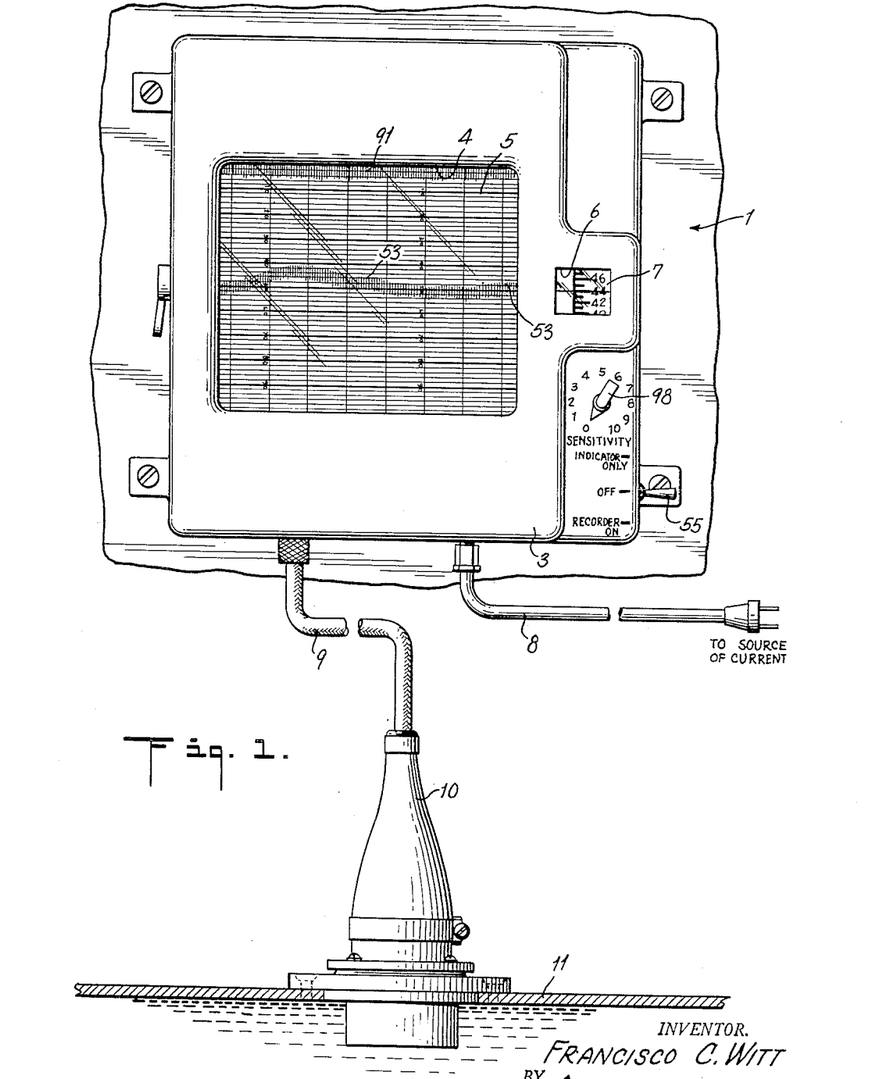
Fig. 1 is an elevational view illustrating the exterior of a combined indicator and recorder constructed in accordance with the invention, together with a sound transmitting and receiving unit such as is used in depth finding.
Figure 2:
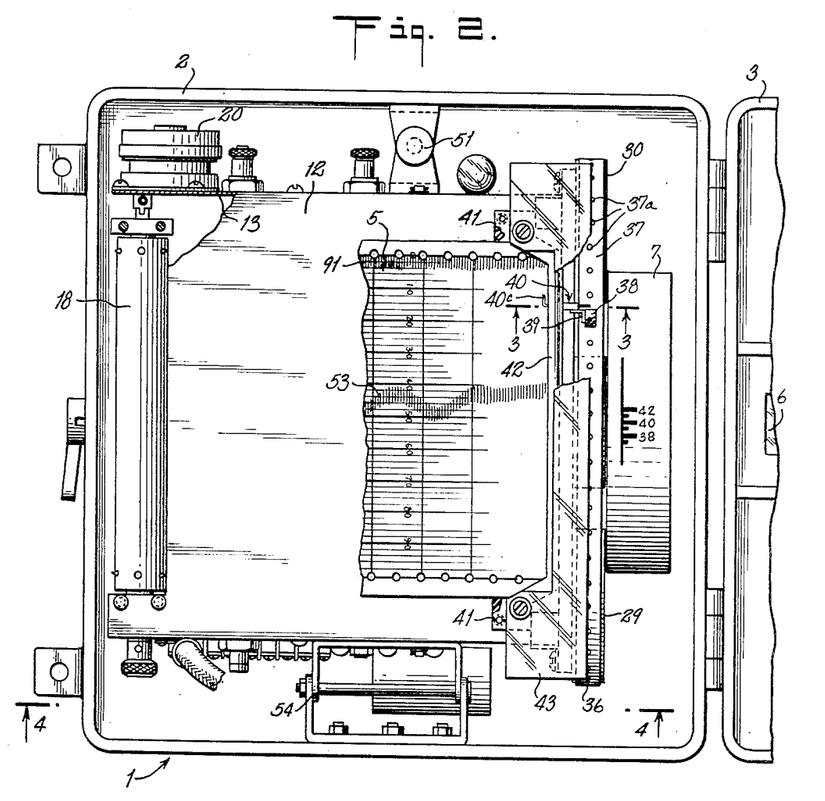
Fig. 2 is an elevational view of the recorder and indicator unit of Fig. 1, with the housing cover swung open and certain parts broken away.

Referring to the drawings, there is shown in Figs. 1 and 2 a combined indicator and recorder unit generally indicated at 1 and enclosed in a housing which includes a base 2 and a hinged cover 3 (see Fig. 2). The cover 3 is provided with a large window 4 through which a record sheet 5 is visible, and a smaller window 6 through which an indicator drum 7 is visible. A screen 6a within the casing carries a hairline for reference purposes when observing the drum.

Figure 11:
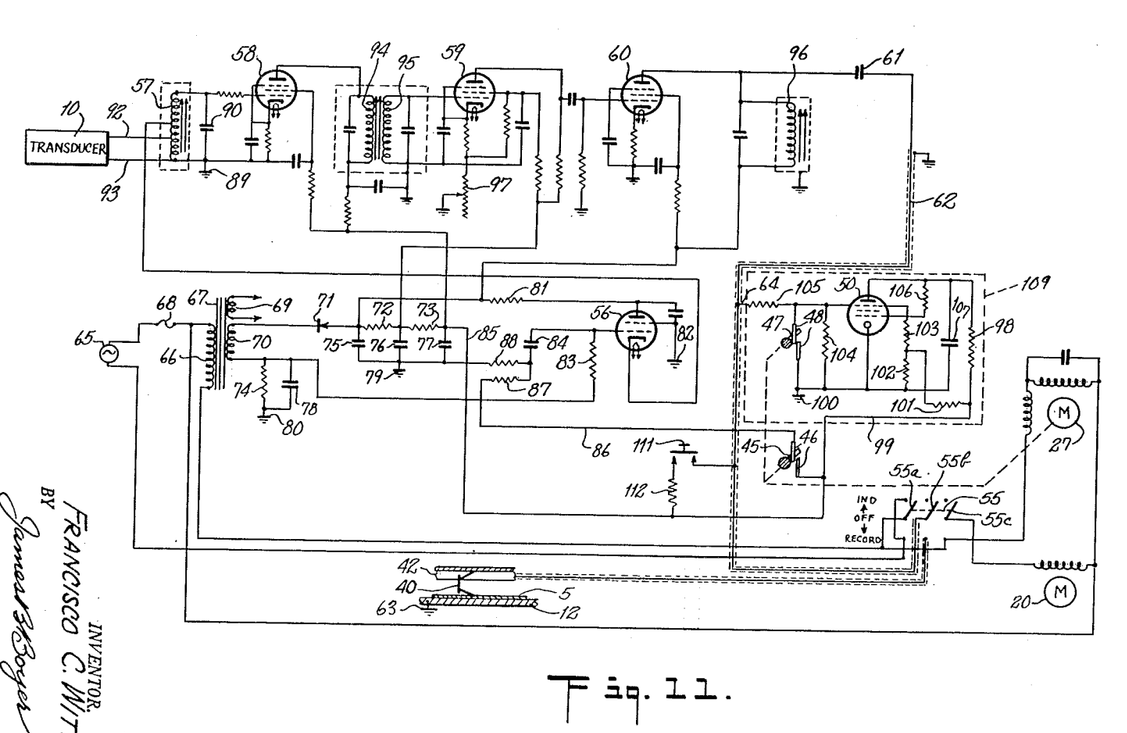
Fig. 11 is an electrical wiring diagram illustrating an electrical circuit which may be used to energize the combined recorder and indicator.

The indicator and recorder unit 1 is shown in Fig. 1 as being provided with a cable 8 leading to a suitable source of electrical energy, indicated in Fig. 11 as being an alternating current supply. Another cable 9 shown in Fig. 1 leads from the indicator and recorder unit 1 to a transducer 10 located in the bottom of the hull 11 of the ship in which the indicator and recorder unit is mounted.

Figure 6:
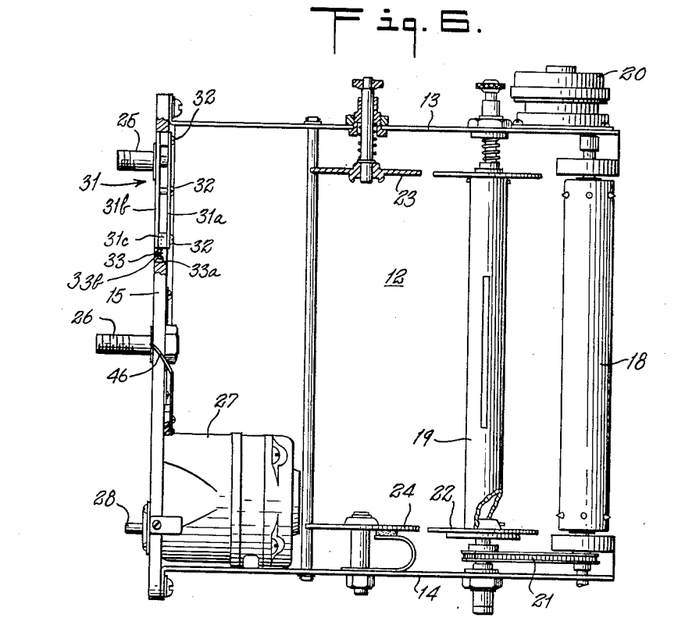
Fig. 6 is a plan view of the main frame removed from the housing, taken from the rear of that frame.

The record sheet 5 and the indicator drum 7 are supported within the housing 2 on a main frame which includes a platen 12 located immediately behind the sheet 5, top and bottom plates 13 and 14 and an end plate 15 (see Fig. 6). The main frame is preferably formed from a single piece of sheet metal, with portions bent to form the various plates. These parts may alternatively be formed separately and attached by any suitable means.

The record sheet 5 is illustrated by way of example as a continuous strip supplied in the form of a roll. The sheet 5 passes from a supply roll 16 (Fig. 3) over a roller 17 located at the right hand end of platen 12, across the outer surface of the platen 12, over a sprocketed drive roll 18 (Fig. 2) located at the opposite side of platen 12 and thence onto a receiving roll 19 (Fig. 6).

The sheet 5 is perforated to receive the sprockets on the drive roll 18, which is driven by a synchronous motor 20. The receiving roll 19 is driven from the shaft of roll 18 through a chain belt 21 and a slip friction drive 22, to accommodate differences in the speed of receiving roll 19 as the diameter of the strip rolled thereon varies. The supply roll 16 is supported between an end plate 23, which is made retractable so that a new supply roll can be conveniently inserted, and another end plate 24 which is spring loaded to maintain the record strip under slight tension so that it will feed smoothly without any sag. It may be seen that all the driving and supporting mechanism for the strip 5 is mounted on the top and bottom plates 13 and 14. That mechanism as illustrated and described is conventional and may be replaced by equivalent mechanism without departing from the present invention.

The end plate 15 carries two studs 25 and 26 (Fig. 6). A synchronous motor 27 is mounted on the inside of end plate 15 and drives a shaft 28 extending outwardly through the plate 15. On the shaft 28 is fixed a drive pulley 29 (see Fig. 5). Another pulley 30 is rotatably mounted on the stud 25.

The stud 25 is not fixed directly to the plate 15, but is attached to a composite sliding plate 31 (Fig. 6) formed by two spaced plates 31a and 31b fastened together by means of screws 32. The end plate 15 is provided with an aperture for receiving the plate 31. This aperture is flanged along its longitudinal edges, these flanges projecting between the plates 31a and 31b. The aperture is somewhat longer than the plate 31, so that the latter is slidable endwise in the aperture. A pin 33 having a head 33a is slidable in an end flange 31c formed on the plate 31b. A coil spring 33b encircles pin 33 and biases the plate 31 upwardly, as it appears in Fig. 6.

The stud 26 is hollow. Rotatably mounted on the stud 26 by means of a suitable bearing is a pulley 34 having a hub 34a and also having one side of its periphery connected by means of an annular disc 34b to the indicator drum 7. The pulley 34 is provided with sprockets 35. The drive pulley 29 is similarly provided with sprockets 36, but pulley 30 has a smooth periphery. A band or belt 37, preferably of flexible metal, passes over the drive pulley 29, the pulley 34 and the pulley 30. The belt 37 is provided with perforations 37a spaced to receive the sprockets 35 and 36 on the pulleys 34 and 29. The sprockets on the pulleys 29 and 34 and the mating perforations in the belt 37 insure that these pulleys and the belt are always driven in a fixed time relationship, without slippage between them.

The spring 33 and sliding plate 31 are effective to maintain the belt 37 under tension, so that the slack in the belt is held at a minimum. The spring 33 and plate 31 also allow ready assembly of the belt over the sprocketed pulleys.

Mounted on the belt 37 is a post 38 of insulating material, on which is adjustably supported a bracket 39, carrying a sleeve 39a of generally elliptical cross-section projecting over the end of the record strip 5. Frictionally mounted within the sleeve 39a is a resilient wire stylus generally indicated at 40. The stylus 40 (see Fig. 3) includes a U-shaped portion 40a whose straight sides are received within the sleeve 39a. The closed end of the U-shaped portion 40a has the form of an expanded loop which holds the stylus from slipping out of the sleeve. The stylus 40 has its free ends bent to form upwardly and downwardly projecting end portions 40b and 40c.

Figure 5:
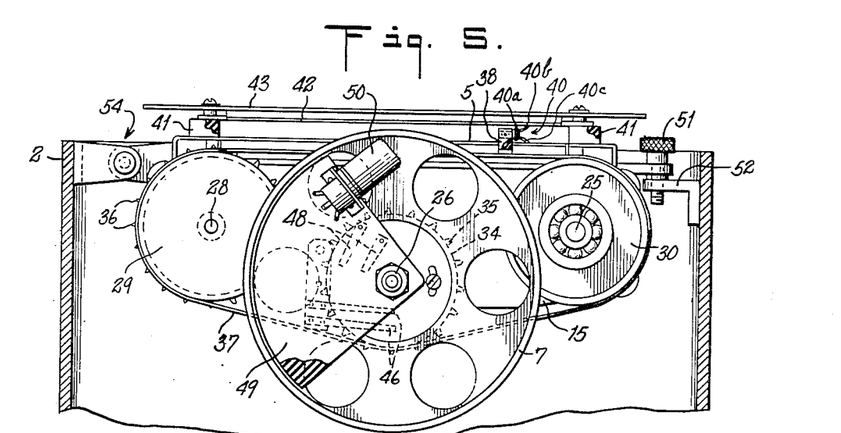
Fig. 5 is a cross-sectional view taken on the line 5—5 of Fig. 4.

As the belt 37 moves, it carries the stylus 40 on an endless path including a straight line portion crossing the record strip 5 from right to left as viewed in Fig. 5 and a return portion extending around the pulleys 29, 34 and 30 back to the right hand side of the strip and thence over the same path again.

A pair of insulating blocks 41 are provided at the opposite sides of the platen 12. These blocks support a track 42 which spans the strip 5 in alignment with the path of the stylus 40. The under side of the track 42 is grooved or made concave to receive and guide the upwardly projecting end portion 40b of the stylus during its movement across the record strip. The stylus always moves in the same direction and its ends are bent at angles oblique to its direction of movement so as to trail against the track 42 and the record sheet 5. The stylus is formed of resilient wire, and the spacing between the track and the record sheet is made slightly smaller than the free spread between the stylus ends so as to maintain a good electrical contact between the stylus and the two elements which it engages.

Above the stylus 40 and the track 42 is mounted a guard plate 43 of insulating material to protect anyone who opens the cover 3 against accidental contact with the track 42 which at times carries relatively high electrical potentials.

Figures 7, 8, 9:
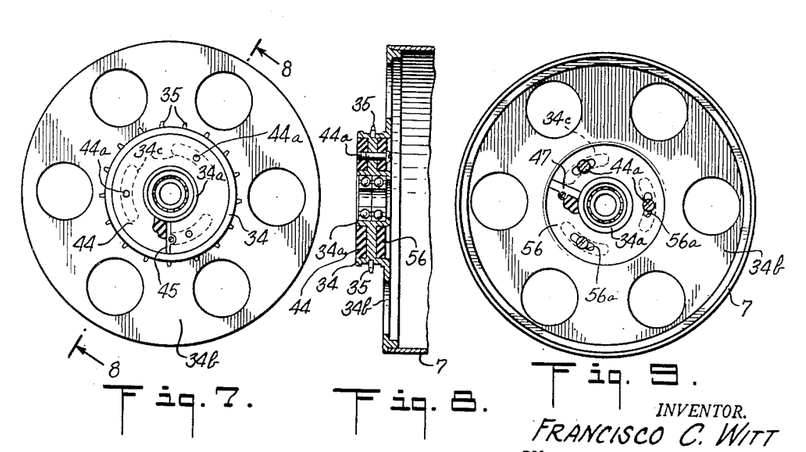
Fig. 7 is a left hand elevational view of the indicator drum.
Fig. 8 is a cross-sectional view taken on the line 8—8 of Fig. 7.
Fig. 9 is a right hand elevational view of the indicator drum.

The hub 34a carries on its inner side adjacent the plate 15 an annular insulating disc 44 having embedded therein a radial contact segment 45 (see Fig. 7). The contact segment 45 is effective at a predetermined angular position of the hub 34a to connect electrically a pair of stationary contact fingers 46 which are insulatingly mounted on the plate 15. The electrical connection of these contacts initiates the generation of a signal in a manner to be described below.

The hub 34a carries on its outer surface another annular insulating disc 56 having embedded therein another radially extending contact 47. The contact segment 47 is effective at a predetermined angular position of the hub 34a to connect electrically a pair of contact fingers 48 (Fig. 5) mounted on the inside of an insulating plate 49 fixed on the end of stud 26. The plate 49 also carries a lamp 50 and certain electrical elements cooperating therewith (not shown in Fig. 5). The electrical connections to the elements mounted on plate 49 may consist simply of two wires brought out through the hollow stud 26 and a ground connection to the stud itself.

The principal operating elements thus far described are all mounted on the main frame, which, as previously described, includes the platen 12, the top plate 13, the bottom plate 14 and the end plate 15. This main frame is mounted on a hinge 54 (Fig. 2) on the lower side of the housing 2 and is held in place within the housing by a threaded bolt 51 having a knurled head and attached to the upper side of the frame and threadedly engaging a lug 52 attached to the inside of the housing. When the bolt 51 is unscrewed, the frame may be swung outwardly and downwardly, as viewed in Figs. 1 and 2, so that access may then be had to all the parts mounted on the frame and those on the housing 2 under the frame. This movement carries the indicator drum 7 out of the casing so that the lamp 50 and other parts mounted on the plate 49 also become accessible.

Figure 10:
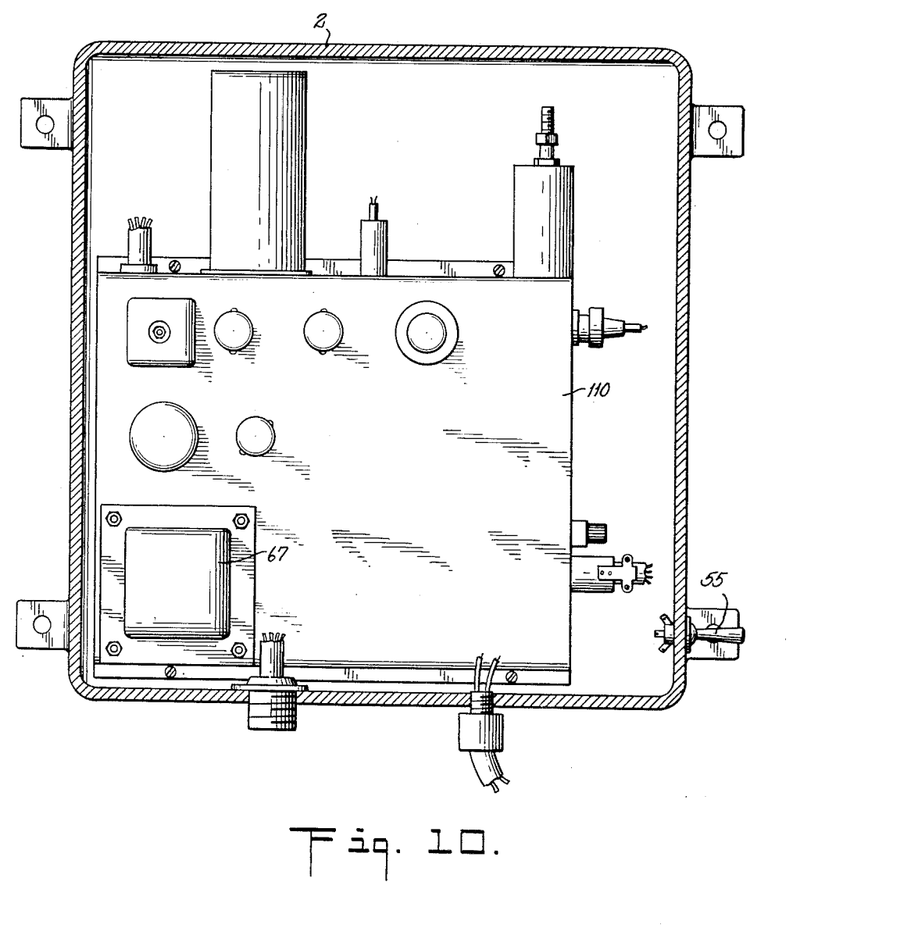
Fig. 10 is an elevational view of the main housing with the main frame removed, showing the mounting of some of the electrical parts on the base of the housing.

Fig. 10 shows how the principal parts of the electric circuit are mounted on a plate 110 attached to the bottom of the casing 2 so as to be accessible when the main frame is swung outwardly.

The operation of the parts thus far described will now be briefly reviewed. When the apparatus is in operation, the belt 37 is continuously driven by the motor 27 and in turn drives the indicator drum 7 together with its hub 32 and the contact segments 45 and 47. The number of perforations 37a on the belt 37 must be a whole multiple of the number of sprockets 35 on the indicator pulley 34. If the parts are assembled so that the stylus end 40c is at the zero mark on the record sheet 5 at the same time that the zero index on the drum 7 is opposite the window 6, then the drum 7 will always be in this angular position when the stylus is at the zero mark on the record sheet. The angular positions of the segments 45 and 47 must be arranged so that they connect their respective sets of stationary contact fingers 46 and 48 at the same time that the zero indication on the drum 7 passes the window 6.

As described more completely below, each time that the segment 45 connects the contact fingers 46, a signal is initiated which is converted at the transducer 10 into a compression wave or sound wave and directed toward the bottom of the body of water in which the ship is floating. This wave is reflected off any body having a different density than the water, typically the bottom, and the reflected wave returned to the transducer 10 which then reconverts it into an electrical signal which is transmitted through and amplified by a circuit to be described in connection with Fig. 11. The amplified signal may be utilized to produce either or both of two electrical effects. One effect is the transmission of an electrical potential to the track 42 and thence through the stylus 40 to the record strip 45 and platen 12, which is grounded. The strip 5 is electrically conductive and sensitive to the passage of current through it. That is, it is of a type which is marked when an electric current passes through it. Consequently, the electrical potential applied to the track 42 results in a mark on the chart such as those illustrated at 53 in Figs. 1 and 2. The other electrical effect is a momentary flash of the lamp 50 so that the particular depth indication on the drum 7 then passing behind the window 6 is illuminated.

In the apparatus illustrated, there are three times as many perforations in the belt 37 as there are sprockets in the pulley 34. With this arrangement, the stylus traverses the record sheet during one revolution of the indicator drum 7, but during the next two revolutions of the drum, the stylus is completing its endless path of travel and does not traverse the record sheet. A second stylus could be mounted on the belt 37 to produce additional marks on the record sheet, or second and third styli might be added so that a stylus would be traversing the sheet to produce a mark on the record for every flash of the indicator lamp. However, a single stylus produces a satisfactory record.

It is desirable to have the stylus mark the record sheet at the zero datum as well as at the time when the echo is received. Such a datum mark confirms that the instrument is properly calibrated. It is undesirable, however, that the lamp 50 be flashed when the zero is opposite the window 6, since that would confuse the indication presented to the eye, by producing an alternate flashing of zero and of some other indication, both indications appearing at the same position. The contact segment 47 and its related contact fingers 48 are provided to prevent flashing of the lamp 50 at the zero datum, in a manner to be described more fully below. This prevention of the lamp 50 from flashing is accomplished without suppressing the mark on the record strip 5 at the zero datum.

The apparatus is described as being connected to a transducer 10 which when electrically energized, mechanically vibrates to produce a compression or sound wave signal impulse, and also is effective when such a compression wave signal impinges upon it to produce an electrical signal. The circuit to be described hereinafter is particularly adapted for use with such a transducer. However, it will be recognized that the combined recorder and indicator unit shown is not necessarily limited to use with such a transducer, but may be used in a system employing separate sound transmitter and receiver elements.

The apparatus shown is provided with a master switch 55 movable between a center off position, an upper position marked "Indicator Only" in Fig. 1 and a lower position marked "Recorder On." A switching arrangement is provided in the electrical circuit which insures that the indicator only will be actuated when the switch is in its upper position, while both the indicator and recorder will be effective when the switch is in its lower position.

The electrical circuit to be described below is arranged to that when the indicator and recorder are both being operated, the operation of the recorder effectively prevents the flashing of the indicator lamp. This occurs because the stylus-to-ground impedance of the recorder is substantially lower than the input impedance of the lamp. This does not adversely affect the operation of the indicator, however, since the recorder only operates on one out of every three cycles of indicator operation, as pointed out above.

This specific circuit forms no part of the present invention and is illustrated herein by way of example. It may be replaced by other circuits performing the equivalent functions, which circuits may actuate the indicator and recorder either together or separately.

Fig. 11 is a wiring diagram of this electric circuit. The principal parts of the circuit shown in Fig. 11 and their functions will be briefly described before proceeding with a detailed description of the circuit.

The motor 20 of Fig. 11 is the record strip driving motor 20 of Figs. 2 and 6. The motor 27 is the motor 27 of Fig. 6 and drives the belt 37 which carries the stylus 40, and which in turn drives the indicator 7, and the moving contacts 45 and 47 on the hub of the indicator.

The contacts 45 and 46 are connected in the input circuit of an electric discharge device 56. The output circuit of the discharge device 56 is connected through a coupling coil 57 to the transducer 10. The transducer 10 responds to an electrical signal by producing a mechanical vibration of predetermined frequency which in turn produces a compression wave of that frequency in the fluid in which the transducer 10 is located. The particular frequency selected may be either within or without the audible frequency range. By way of example, a frequency of 50,000 cycles has been used.

The coupling coil 57 is also connected to the input circuit of an electric discharge device 58, which is connected in the first stage of a three-stage cascade amplifier. The second and third stages of the amplifier respectively include electrical discharge devices 59 and 60. The output circuit of the final amplifier stage is connected through a coupling condenser 61 to a shielded cable 62 leading through contact 55b of the switch 55 to the track 42 and thence through the stylus 40, sheet 5 and the platen 12 to ground at 63.

Also connected to the shielded cable 62 is a conductor 64 leading to the input circuit of an electric discharge device 50. This is identical with the lamp 50 of Fig. 5. It has been termed a lamp herein because its function is to illuminate the indicator 7. When an electrical impulse is applied to the input circuit of the lamp 50, it flashes so as to illuminate the indicator 7. The contacts 47 and 48 are connected in the input circuit of the device 50 so as to prevent transmission of a signal to that device when the contacts are closed.

The circuit of Fig. 11 will now be described in detail. Electrical energy is supplied to the circuit from any suitable alternating current source 65 to the primary winding 66 of a transformer 67. One side of the line connecting the winding 66 to the source 65 extends by means of a circuit which may be readily traced on the drawing through contact 55a of the three-pole double throw switch 55. The windings of motor 27 are connected across the power supply lines in parallel with the winding 66 of the transformer and in series with contact 55a of switch 55. A fuse 68 may be connected in one of the lines. When the switch 55 is closed in either position the motor 27 and the transformer winding 66 are energized. When the switch 55 is closed in its lower position, the motor 20 is also energized through contact 55c and the shielded cable 62 is connected through contact 55b to the track 42.

The transformer 67 has two secondary windings 69 and 70. The winding 69 is utilized to supply heating current to the cathode heaters of the discharge devices 56, 58, 59, 60. These connections are omitted to avoid confusion of the drawing. The winding 70 supplies electrical energy to the various input and output circuits of the several electrical discharge devices. The secondary winding 70 is connected through a rectifier 71 to a conventional filter network including resistances 72, 73 and 74 and condensers 75, 76, 77 and 78. This network is grounded at 79 and 80 intermediate its positive and negative terminals. The anode of the discharge device 56 is connected to a positive terminal of the filter network through resistance 81. One control electrode of device 66 is connected to ground at 82. The other control electrode of the device 56 is connected through a resistance 83 to the negative end of the filter network at the lower end of transformer winding 70. This control electrode is also connected through a condenser 84 to a branch circuit which may be traced from a positive terminal of the filter network through a conductor 85, switch contacts 45 and 46, a conductor 86, a resistance 87 and a resistance 88 to ground at 79. The cathode of the discharge device 56 is connected to a center tap on the coupling coil 57. One end terminal of the coil 57 is connected directly to ground at 89, and the other end terminal is connected to ground through a condenser 90.

The discharge device 56 is normally non-conductive. When the device is non-conductive, the cathode is at ground potential while the nearest control grid is at a potential sufficiently negative with respect to ground so that the device is biased to cut-off. When the contact 45 bridges the contacts 46, current flows through the resistances 87 and 88 and a charging current flows through condenser 84 and resistor 83 to change the potential of the control electrode in a positive sense and render the device 56 conductive. The current flowing through the output circuit of the cathode produces a high potential drop across the coil 57, making the cathode more positive and tending to cut off the current flow soon after it starts.

The current enters the coil 57 at a center tap, and flows in opposite directions in the two halves of the coil. The magnetic fields set up by the currents in the two halves of the coil oppose each other, so that the impedance of the coil to this current is very high. The capacitance of condenser 90 is selected so that its impedance is substantially lower than that of one half of coil 57 to this current. Consequently the potential drop across the condenser 90 produced by a current flow through the discharge device 56 is relatively low. This potential drop is sufficient however to provide an input signal which is transmitted through the amplifier to the shielded cable 62. At this time, the contacts 47, 48 are closed so that any signal applied to cable 62 is ineffective to flash the lamp 50. However, if the switch 55 is closed in its lower position, then this signal on cable 62 is transmitted through contact 55b to the track 42 and the stylus 40 to mark the record strip 5 at the zero datum, as indicated at 91 in Figs. 1 and 2.

The current flowing through the lower half of the coil 57 produces a potential drop, part of which is transmitted through conductors 92 and 93 to the transducer 10 and causes the transducer to vibrate and produce a compression or sound wave directed toward the bottom of the body of water in which the ship carrying this apparatus is floating.

When an echo is received from the bottom by the transducer, it produces an electrical signal which is applied through the conductors 92 and 93 to the lower section of the coil 57. This signal current from transducer 10 produces a magnetic field in the core of coil 57, which field is unopposed since the device 56 is now cut off. The coil 57 now acts as an auto-transformer to step up the potential of the signal applied through the conductors 92 and 93. This increased potential is applied between the cathode and one control electrode of the device 58 and is thence transmitted through the three stages of the amplifier to the shielded cable 62. If switch 55 is in its lower position and stylus 40 is between the track 42 and record strip 5, then this potential applied to cable 62 is effective to mark the chart 5, as shown at 53 in Figs. 1 and 2. The spacing between the marks 91 and 53 depends upon the time required for the compression wave signal to travel from the transducer to the bottom and back again, and consequently that spacing, like the time interval in question, is a measure of the depth of the water.

The amplifier including the discharge devices 58, 59, and 60 operates in a conventional manner. The coupling coils 57, the coupling coils 94 and 95 between the first and second stages and the output coil 96 are all provided with movable cores so that their circuits may be tuned to match the frequency of the particular transducer 10 with which the amplifier is connected. The amplifier is provided with a gain control including a variable resistance 97 connected between the cathode of the discharge device 59 and ground. This resistance is varied by operating the knob 98 labelled "Sensitivity" in Fig. 1.

Since the circuits in the amplifier stages are conventional except as noted above, they will not be further described.

The discharge device or lamp 50 is of the cold cathode gase filled type. For example, it may be of commercial type OA 5. It is shown as having three control electrodes, the middle one of which is floating. The anode of discharge device 50 is connected to a positive terminal of the filter network through a resistance 98 and conductors 99 and 85. The cathode of the device 50 is connected to ground at 100. Two resistors 101 and 102 are connected in series between conductor 99 and ground at 100. The junction between these two resistors is connected through another resistor 103 to the upper control electrode, which is also connected to ground through a resistor 104. This control electrode is also connected through a resistor 105 to the shielded cable 102. The contacts 47 and 48 are effective when closed to shunt the resistor 104 and connect this control electrode directly to ground. The lower control electrode is connected to the anode through a protective resistance 106. A condenser 107 is connected between the anode and ground.

The discharge device 50 is normally non-conductive. When a signal is received on the shielded cable 62, then if the switch contact 55b is closed in its upper position or if it is closed in its lower position and the stylus 40 is not between the track 42 and the record sheet 5, this signal is transmitted through resistance 105 to the upper control electrode and causes the discharge device 50 to flash momentarily. The discharge of the device 50 drains the condenser 107 of its charge and also produces a potential drop across resistor 98. These two effects combine to substantially cut off the potential between the anode and the cathode of the device 50, producing a self-quenching action. The device 50 then remains in its inactive state until a signal is again received through resistance 105. During this inactive period, condenser 107 is again charged. The impedance to ground from the cable 62 through stylus 40 is substantially lower than the impedance to ground from cable 62 through resistors 105 and 104. Consequently, if the switch 55 is closed in its lower position, and stylus 40 is between the track 42 and the strip 5 when a signal is applied to cable 62, then the input circuit of the discharge device 50 is effectively short-circuited and the device 50 is not flashed.

Although the contacts 47, 48 at times shunt the input circuit of device 50, the resistance 105 prevents these contacts from shunting the stylus 40. Consequently, the zero marking signals are received at the stylus even though the contacts 47, 48 are closed.

When the device shown in Figs. 1 to 10 is operating, the stylus 40 is in its active position between the track 42 and the strip 5 only on every third signal. Consequently when the switch 55 is in its lower position, the circuit shown in Fig. 11 produces a record on the sheet 5 on every third signal and flashes the tube 50 on the two intervening impulses. The motor 27 runs fast enough so that the stroboscopic effect of the tube 50 is not adversely affected by the fact that the tube skips every third signal.

It would be possible to provide a circuit which could trigger the lamp or discharge device 50 and supply a signal to the stylus 40 at the same time. However, by using the arrangement shown, the amplifier and its couplings are simplified considerably without adversely affecting either the record formed on the sheet 5 or the indication produced on the drum 7.

All the circuit elements associated with the lamp 50 and shown within the dotted line frame 109 in Fig. 11 are mounted with the lamp 50 on the insulating plate 49. With this arrangement, the only external circuit connections required are the ground connection 100 and the wires 64 and 99. The stud 26 is grounded and provides the necessary ground connection. The wires 64 and 99 are brought out through the hollow stud 26 from the inside of the swinging frame, and hence these connections do not interfere with the swinging of the frame nor with the rotation of the drum 7.

Since the motor 20 which drives the record sheet is independent of the motor 27 which drives the stylus 40 and the indicator drum 7, either motor may be changed to vary the speed of the elements driven by it without affecting the speed of the elements driven by the other motor. For example, it may be desirable to change the motor 27 to provide the apparatus with a different range of operation. If the belt 37 is driven at a lower speed, then the apparatus covers a greater range of depth, while if a higher speed is used, the range is smaller. The use of separate motors makes it easy to change the range of the apparatus without changing the time scale on the record sheet and thereby provides a considerable improvement over some of the prior art arrangements wherein a single motor drives both record chart and stylus through a complex gearing.

Figure 3:
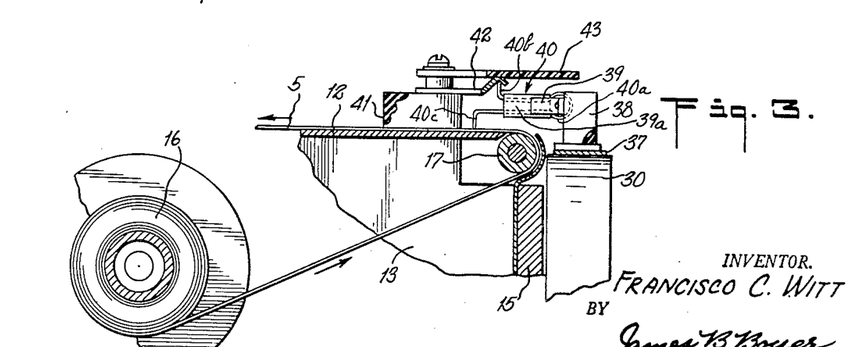
Fig. 3 is a fragmentary cross-sectional view taken on the line 3—3 of Fig. 2.
Figure 4:
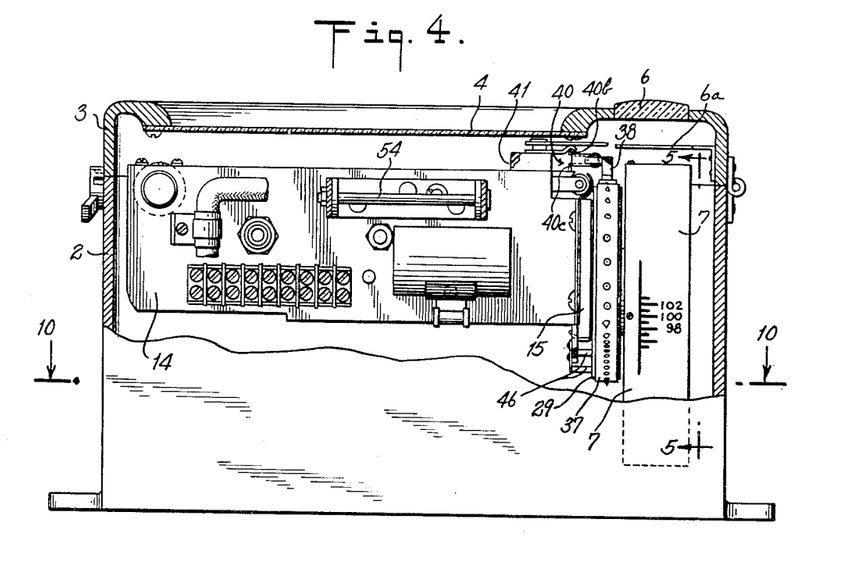
Fig. 4 is a cross-sectional view taken on the line 4—4 of Fig. 2.

The form of stylus shown in Fig. 3 is slightly different from that of Fig. 4. In the Fig. 3 construction, the leg of the stylus carrying the end portion 40c which engages the record strip 5 is somewhat longer than the other leg, so that the end portion 40c extends out from under the track 42 and is visible from outside the casing as it moves across the record strip. In Fig. 4, the end portions 40b and 40c are vertically aligned, and the end portion 40c is not visible from directly in front of the track 42.

It may at times be desirable to make a transverse datum mark all the way across the record sheet 5, to mark a particular time. For that purpose there is provided a push button 111 (Fig. 11). When depressed, the push button 111 completes a circuit from a positive terminal of the filter network through a current limiting resistor 112 to the shielded conductor 62 and the stylus 40 to ground at 63 and thence to the ground connection 79 in the filter network. The datum mark is made by simply depressing this button while the recorder is in operation, which causes the transmission of a continuous current through the stylus as long as the button is depressed. If the button is held down throughout a continuous passage of the stylus across the sheet, a straight mark will be made all the way across the sheet.

The angular position of the signal initiating contact 45 with reference to the pulley 34 and the zero index on the periphery of the drum 7 may be adjusted by means of screws 44a which are threaded into the disc 44 and which pass through arcuate slots 34c in the pulley 34 and arcuate slots 56a in the disc 56. Adjustment of contact 45 with respect to drum 7 is accomplished by loosening screws 44a and then shifting them and the disc 44 bodily with respect to pulley 34 and drum 7. In a similar manner, adjustment of zero signal suppressing contact 47 with respect to drum 7 is accomplished by loosening screws 44a and then turning disc 56 on the screws. The screws 44a are of course tightened after an adjustment is completed.

By coordinating the adjustment of the angular position of contact segment 45 with reference to the pulley 34 and the adjustment of stylus 40 with reference to the belt 37, the apparatus may be set so that contact segment 45 starts to bridge the fingers 46 just as the stylus 40 passes the zero depth datum on the record sheet.

Any suitable type of transducer 10 may be used, as long as it is effective to produce a compression wave when energized by an electrical signal, and to produce an electrical signal when a compression wave impinges upon it. The principal commercially available transducers may be classified as either magnetostrictive or piezoelectric types. It is preferred to use a piezoelectric transducer of the barium titanate ceramic type.

I claim:

1. Recording apparatus comprising a record sheet markable by discharge of electrical energy therethrough, an electrically conductive platen behind the sheet, electrical stylus means, means for moving said stylus means along a path crossing the front of the record sheet, said stylus means being resilient and comprising a base portion attached to said moving means and free end portions bent to form a first end portion projecting toward the sheet and a second end portion projecting away from the sheet, an electrically conductive track extending in a plane parallel to and spaced from the front of said sheet and aligned with said path and engageable by said second end portion, said track being spaced from said sheet by a distance smaller than the free spread between said end portions, so that the end portions are compressed between the track and the sheet and said stylus means is maintained in compressive engagement with said track and said sheet regardless of the spacing between the stylus moving means and the sheet, and means for impressing an electric potential between the platen and the track to produce record marks on the sheet.

2. Recording apparatus as defined in claim 1, in which the side of the track engaged by the second stylus end portion is grooved to receive said end portion and aid in guiding the stylus along its path.

3. Apparatus for indicating time intervals, comprising a housing having a window, an indicator cylinder within said housing and having on its outer surface a series of interval indicating indicia, means rotatably supporting said cylinder including a rotatable hub, an annular plate fixedly connecting the hub to one end of the cylinder, means for rotating said hub, plate and cylinder at a constant speed, two annular insulating discs attached to the annular plate on either side thereof, two radially extending contact segments, one in each of said insulating discs, a first fixed support within said cylinder, a lamp on said support, a first pair of contact fingers mounted on said support and having their ends resiliently riding on one of said insulating discs, a second fixed support mounted on the other side of the hub from said cylinder, a second pair of contact fingers mounted on said second support and having their ends resiliently engaging the other of said insulating discs, both said pairs of contact fingers being angularly arranged to engage the contact segments in their respective insulating discs when a datum indicia on the cylinder is opposite said window, means including said second pair of contact fingers for generating a signal defining the beginning of a time interval, said generating means being effective to generate a signal when said second pair of fingers are connected by their associated contact segment, means for receiving signals defining the ends of time intervals, means responsive to said received signals for energizing said lamp, and means including said first pair of contact fingers for preventing energization of said lamp, when said first pair of fingers are connected by their associated contact segment.

4. Apparatus for indicating time intervals as defined in claim 3, in which said cylinder is open at the end opposite said annular plate, said second support comprises a frame and hinge means connecting said frame to said housing, and said first fixed support includes a stud fixed to said frame and rotatably supporting said hub and extending within said cylinder and a mounting plate fixed on the stud within the cylinder and supporting said lamp, said frame being swingable out of the housing on said hinge means so that the lamp is accessible through the open end of the cylinder.

5. Apparatus for indicating time intervals as defined in claim 3, including means for angularly adjusting said contact segments with respect to said cylinder, said adjusting means comprising a plurality of screws threadedly attached to one of said annular insulating discs at circumferentially spaced points, the annular plate and the other annular insulating disc having arcuate slots radially aligned with said screws and through which said screws extend, said screws having heads on the opposite side of said other disc, so that both said discs may be clamped to said annular plate by tightening said screws, and both discs are independently angularly adjustable with respect to said plate when said screws are loosened.

6. Apparatus as defined in claim 3, including time interval recording apparatus comprising a pulley wheel fixed on said cylinder for rotation therewith, sprockets on said pulley wheel, a flexible metal belt having perforations to receive said sprockets and running over said wheel, the number of said perforations being a whole multiple of the number of sprockets on said pulley, an electrically conductive stylus mounted on said belt, an electrically sensitive record sheet mounted adjacent the path of said stylus to be traversed by the stylus as said cylinder rotates, and means for energizing said stylus in response to said generated and received signals to inscribe on said record sheet spaced marks defining said time intervals.

7. Apparatus for indicating and recording time intervals, comprising an electrically sensitive record sheet, an endless flexible metal belt having spaced perforations and extending transversely of said sheet, a stylus mounted on said belt and movable thereby along a continuous path which extends across the face of the sheet, said stylus being effective when electrically energized to mark the sheet, a rotatable translucent indicator drum adjacent one end of the sheet and having a series of interval indicating indicia in its periphery, a housing enclosing said record sheet and said drum and having one window through which the drum indicia become visible as the drum rotates, a lamp supported within the drum, a pulley on said drum to receive said belt, sprockets on said pulley to be received in said perforations, said belt having a number of perforations which is a whole multiple of the number of sprockets on said pulley, said perforated belt and sprockets being effective to hold the stylus and drum in relative positions such that when said stylus is adjacent a datum mark on the sheet, a datum indicia on the drum is behind the drum window, means for continuously driving said belt and drum at a predetermined speed, and means for electrically energizing said stylus to mark the sheet and for electrically energizing the lamp to illuminate the drum indicia.

8. Apparatus for indicating and recording time intervals, comprising an electrically sensitive record sheet, a stylus, means for moving said stylus along a continuous path which extends across the face of the sheet, said stylus being effective when electrically energized to mark the sheet, a rotatable translucent indicator drum adjacent one end of the sheet and having a series of interval indicating indicia in its periphery, a housing enclosing said record sheet and said drum and having one window through which the drum indicia become visible as the drum rotates, a lamp supported within the drum, means for generating spaced electrical signals to define the beginnings of time intervals to be recorded, means connecting said stylus moving means, said drum and said signal generating means for concurrent movement in relative positions such that when said stylus is adjacent a datum mark on the sheet, a datum indicia on the drum is behind the drum window and a signal is generated, means for continuously driving said stylus moving means, drum and signal generating means at a predetermined speed, means to electrically energize the stylus to mark the sheet and the lamp to illuminate the drum indicia at the end of each interval to be recorded, and means to electrically energize the stylus only and to prevent energization of the lamp when said datum indicia is behind the window and an interval-beginning signal is generated.

9. Apparatus for indicating and recording time intervals comprising a time interval indicator including a scale member, an index member adjacent said scale member, means for moving one of said members relative to the other at a predetermined speed, means for flashingly illuminating said moving member so that its position adjacent the other member when illuminated provides an indication of a time interval, a time interval recorder including a record sheet, electrical stylus means, means for moving said stylus means across said record sheet synchronously with the movement of the indicator member, and means to energize said stylus means synchronously with said illuminating means to inscribe marks defining said time intervals on the record sheet, and means selectively operable to render said stylus energizing means active or inactive, said indicator being effective to indicate said intervals in either condition of said stylus energizing means.

References Cited in the file of this patent

UNITED STATES PATENTS

| | | |
|---|---|---|
| 2,394,286 | Blaisdell | Feb. 5, 1946 |
| 2,406,861 | Springer | Sept. 3, 1946 |
| 2,412,234 | Turner | Dec. 10, 1946 |
| 2,465,990 | Anderson | Apr. 5, 1949 |
| 2,597,199 | Stamper | May 20, 1952 |
| 2,610,244 | Wolf | Sept. 9, 1952 |